US009459871B2

(12) United States Patent
Lipshits et al.

(10) Patent No.: US 9,459,871 B2
(45) Date of Patent: Oct. 4, 2016

(54) SYSTEM OF IMPROVED LOOP DETECTION AND EXECUTION

(71) Applicant: INTEL CORPORATION, Santa Clara, CA (US)

(72) Inventors: Masha Lipshits, Haifa (IL); Lihu Rappaport, Haifa (IL); Shantanu Gupta, San Jose, CA (US); Franck Sala, Haifa (IL); Naveen Kumar, San Jose, CA (US); Allan D. Knies, Burlingame, CA (US)

(73) Assignee: Intel Corporation, Santa Clara, CA (US)

( * ) Notice: Subject to any disclaimer, the term of this patent is extended or adjusted under 35 U.S.C. 154(b) by 659 days.

(21) Appl. No.: 13/731,377

(22) Filed: Dec. 31, 2012

(65) Prior Publication Data

US 2014/0189331 A1 Jul. 3, 2014

(51) Int. Cl.
  *G06F 9/30* (2006.01)
  *G06F 9/38* (2006.01)
  *G06F 9/32* (2006.01)

(52) U.S. Cl.
  CPC ........... *G06F 9/30065* (2013.01); *G06F 9/325* (2013.01); *G06F 9/381* (2013.01); *G06F 9/3844* (2013.01)

(58) Field of Classification Search
  None
  See application file for complete search history.

(56) References Cited

U.S. PATENT DOCUMENTS

| 5,740,419 | A | * | 4/1998 | Potter | G06F 9/325 712/23 |
| 5,784,602 | A | * | 7/1998 | Glass | G06F 9/30014 712/220 |
| 5,881,257 | A | * | 3/1999 | Glass | G06F 9/30014 712/200 |
| 5,881,263 | A | * | 3/1999 | York | G06F 9/30043 712/217 |
| 6,003,128 | A | * | 12/1999 | Tran | G06F 9/3844 712/23 |
| 6,145,076 | A | * | 11/2000 | Gabzdyl | G06F 9/325 712/241 |
| 6,269,440 | B1 | * | 7/2001 | Fernando | G06F 8/452 712/241 |

(Continued)

FOREIGN PATENT DOCUMENTS

EP  2674858 A2 * 12/2013

OTHER PUBLICATIONS

'Instruction Fetch Energy Reduction Using Loop Caches for Embedded Applications with Small Tight Loops' by Lea Hwang Lee et al., copyright 1999, ACM.*

(Continued)

*Primary Examiner* — Steven Snyder
(74) *Attorney, Agent, or Firm* — Kenyon & Kenyon LLP

(57) ABSTRACT

A method, system, and computer program product for identifying loop information corresponding to a plurality of loop instructions. The loop instructions are stored into a queue. The loop instructions are replayed from the queue for execution. Loop iteration is counted based on the identified loop information. A determination is made of whether the last iteration of the loop is done. If the last iteration is not done, then embodiments continue replaying the loop instructions, until the last iteration is done.

17 Claims, 8 Drawing Sheets

400

(56) References Cited

U.S. PATENT DOCUMENTS

| | | | | |
|---|---|---|---|---|
| 6,367,071 | B1* | 4/2002 | Cao | G06F 9/381 712/E9.058 |
| 6,959,379 | B1* | 10/2005 | Wojcieszak et al. | 712/241 |
| 7,620,803 | B2* | 11/2009 | Kudo | G06F 9/325 712/200 |
| 7,873,820 | B2* | 1/2011 | Knoth | 712/241 |
| 7,886,134 | B2* | 2/2011 | Mizumo | 712/241 |
| 9,038,042 | B2* | 5/2015 | Perkins | G06F 9/381 717/150 |
| 9,286,066 | B2* | 3/2016 | Seki | G06F 9/30065 |
| 2002/0016887 | A1* | 2/2002 | Scales | G06F 8/4452 711/140 |
| 2002/0144092 | A1* | 10/2002 | Topham | G06F 8/4452 712/217 |
| 2002/0178350 | A1* | 11/2002 | Chung et al. | 712/241 |
| 2004/0039901 | A1* | 2/2004 | Kudo | G06F 9/325 712/237 |
| 2004/0123075 | A1* | 6/2004 | Almog | 712/207 |
| 2005/0102659 | A1* | 5/2005 | Singh | G06F 9/30101 717/150 |
| 2006/0212685 | A1* | 9/2006 | Raghavan | G06F 9/30036 712/225 |
| 2007/0113059 | A1* | 5/2007 | Tran | 712/241 |
| 2009/0024842 | A1* | 1/2009 | Clark | G06F 9/264 712/241 |
| 2009/0235052 | A1* | 9/2009 | Kudo | G06F 9/325 712/205 |
| 2010/0049958 | A1* | 2/2010 | Vaskevich | G06F 9/381 712/241 |
| 2012/0179924 | A1* | 7/2012 | Sugiyama | G06F 1/3206 713/320 |
| 2012/0185714 | A1* | 7/2012 | Chung | G06F 1/3203 713/323 |
| 2012/0226894 | A1* | 9/2012 | Seki | G06F 9/30065 712/241 |
| 2013/0339699 | A1* | 12/2013 | Blasco-Allue | G06F 9/381 712/241 |
| 2013/0339700 | A1* | 12/2013 | Blasco-Allue et al. | 712/241 |
| 2014/0007061 | A1* | 1/2014 | Perkins | G06F 9/381 717/150 |
| 2014/0136822 | A1* | 5/2014 | Suggs et al. | 712/241 |
| 2014/0189306 | A1* | 7/2014 | Merten et al. | 712/208 |
| 2015/0309795 | A1* | 10/2015 | Kurd | G06F 9/30145 712/241 |
| 2015/0309797 | A1* | 10/2015 | Wilson | G06F 9/3013 712/217 |

OTHER PUBLICATIONS

'Instruction Buffering Exploration for Low Energy Embedded Processors' by Tom Vander Aa et al., Journal of Embedded Computing Low-power Embedded Systems, vol. 1 Issue 3, Aug. 2005, pp. 341-351.*

'Revolver: Processor Architecture for Power Efficient Loop Execution' by Mitchell Hayenga et al., copyright 2014, IEEE.*

'Power-Efficient Loop Execution Techniques' dissertation by Mitchell Bryan Hayenga, University of Wisconsin-Madison, copyright by Mitchell Bryan Hayenga, 2013.*

'Power Impact of Loop Buffer Schemes for Biomedical Wireless Sensor Nodes' by Antonio Artes et al., published—sensors, Nov. 6, 2012.*

* cited by examiner

400

500

SYSTEM OF IMPROVED LOOP DETECTION AND EXECUTION

FIELD OF THE DISCLOSURE

The present disclosure relates to a system of improved loop prediction and execution.

DESCRIPTION OF RELATED ART

Microprocessors typically may include components that manages detection and execution of instruction loops. A microprocessor may detect small-sized loops with a large number of iterations. Once detected, the loops are repeatedly executed (replayed) from a queue, to save the power needed for repeating fetching and decoding the loop instructions.

Hardware (HW) loop stream detection (LSD) may have a long "learning" time for detecting eligible loops. The microprocessor may detect short infinitely predicted loops, by tracking instruction jump and branch history. If the same instruction pointer with the same branch history are executed repeatedly, the loop may be "locked" and marked for replay from the queue. If the loop "learning" time is long, the loop execution may require additional power and delays.

When the loop exits, there may be a "mispredict." A mispredict every time the loop exits may cause a flush of instruction pipeline and more delays.

Thus, there is a need for an improved way of detecting and executing loops.

DESCRIPTION OF THE FIGURES

Embodiments are illustrated by way of example and not limitation in the Figures of the accompanying drawings.

DETAILED DESCRIPTION

Figure 1A:
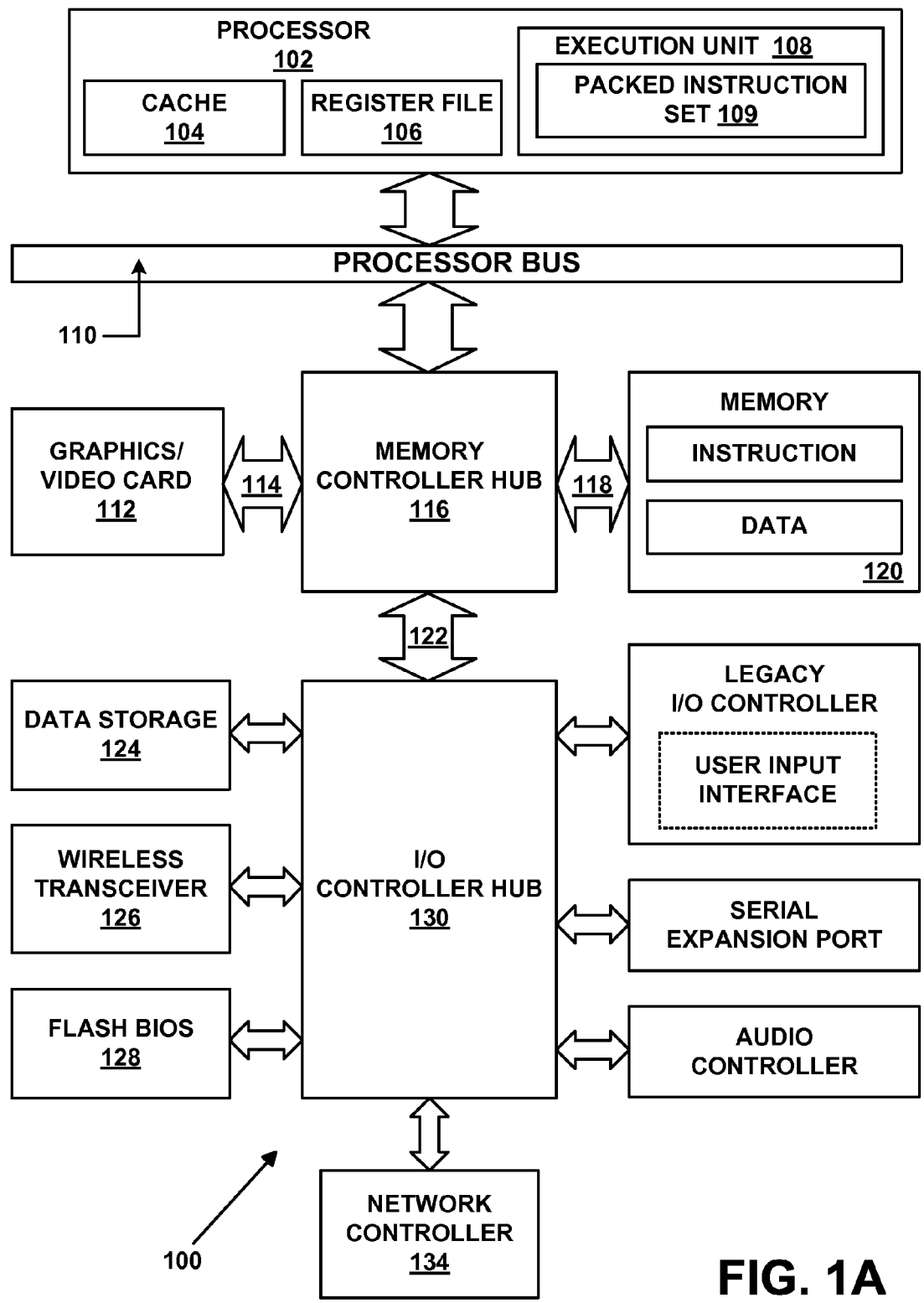
FIG. 1A illustrates a block diagram of a system according to one embodiment.

The following description describes a method and system for improved loop detection and execution within or in association with a processor, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the disclosure may be practiced without such specific details. Additionally, some well known structures, circuits, and the like have not been shown in detail to avoid unnecessarily obscuring embodiments of the present disclosure.

One embodiment of the present disclosure may provide a single core or multi-core processor. The processor may comprise a register file and a permutation unit coupled to the register file. The register file may have a plurality of register banks and an input to receive a selection signal. The selection signal may select one or more unit widths of a register bank as a data element boundary for read or write operations.

Although the following embodiments are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 1024 bit, 512 bit, 256 bit, 128 bit, 64 bit, 32 bit, or 16 bit data operations and can be applied to any processor and machine in which manipulation or management of data is performed.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, steps of embodiments of the present disclosure might be performed by specific hardware components that contain fixed-function logic for performing the steps, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file). In one embodiment, registers may include one or more registers, register architectures, register files, or other register sets that may or may not be addressable by a software programmer.

In one embodiment, an instruction may include one or more instruction formats. In one embodiment, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one embodiment, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data are generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that includes execution units to execute an instruction in accordance with one embodiment of the present disclosure. System 100 includes a component, such as a processor 102 to employ execution units including logic to perform algorithms for process data, in accordance with the present disclosure, such as in the embodiment described herein. System 100 is representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

FIG. 1A is a block diagram of a computer system 100 formed with a processor 102 that includes one or more execution units 108 to perform an algorithm to perform at least one instruction in accordance with one embodiment of the present disclosure. One embodiment may be described in the context of a single processor desktop or server system, but alternative embodiments can be included in a multiprocessor system. System 100 is an example of a 'hub' system architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a cache 104, which may be a Level 0 (L0) internal cache memory. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For one embodiment, execution unit 108 includes logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time.

Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by the processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
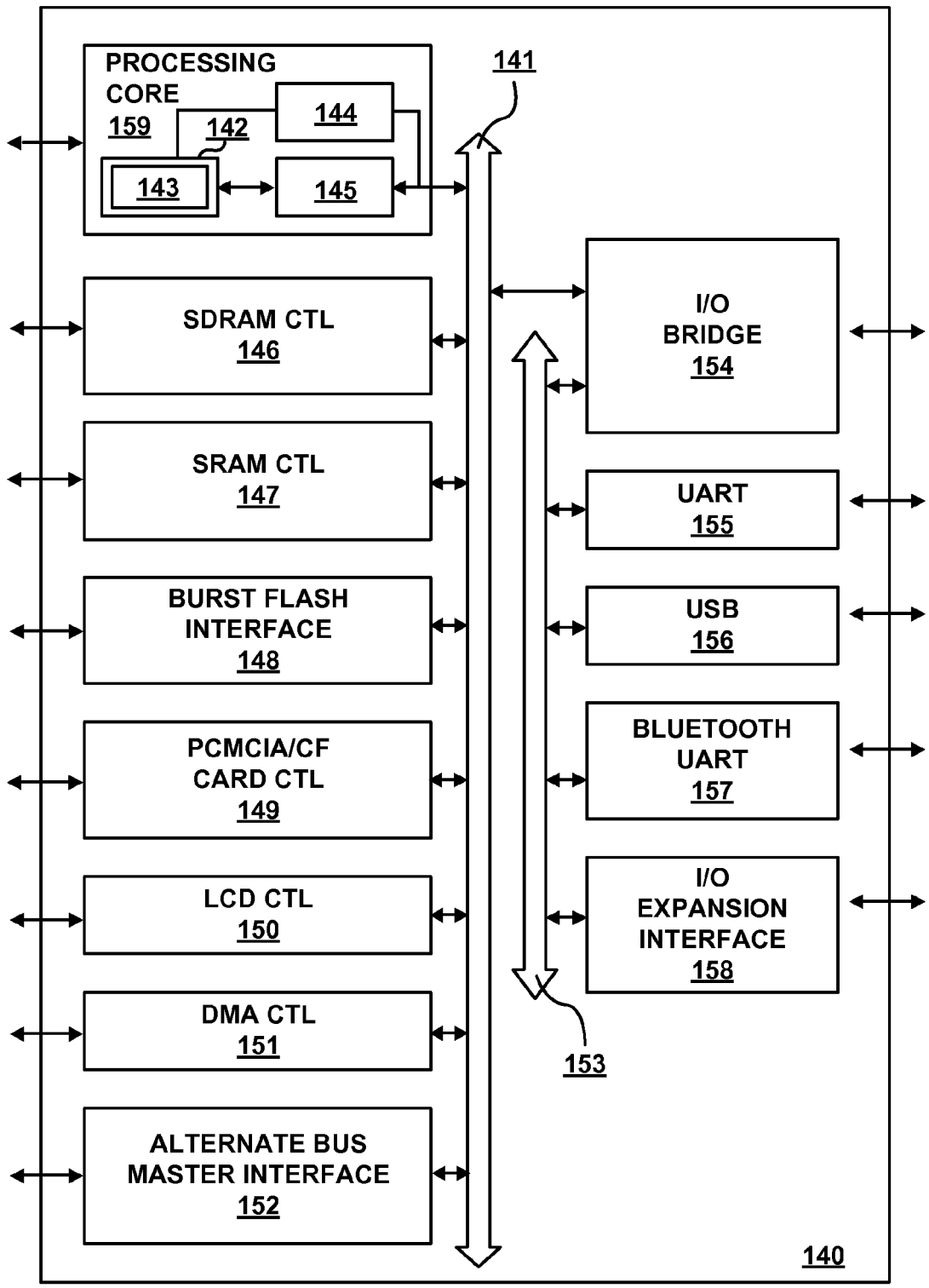
FIG. 1B illustrates a block diagram of a system according to one embodiment.

FIG. 1B illustrates a data processing system 140 which implements the principles of one embodiment of the present disclosure. It will be readily appreciated by one of skill in the art that the embodiments described herein can be used with alternative processing systems without departure from the scope of embodiments of the disclosure.

Computer system 140 comprises a processing core 159 capable of performing at least one instruction in accordance with one embodiment. For one embodiment, processing core 159 represents a processing unit of any type of architecture, including but not limited to a CISC, a RISC or a VLIW type architecture. Processing core 159 may also be suitable for manufacture in one or more process technologies and by being represented on a machine readable media in sufficient detail, may be suitable to facilitate said manufacture.

Processing core 159 comprises an execution unit 142, a set of register file(s) 145, and a decoder 144. Processing core 159 also includes additional circuitry (not shown) which is not necessary to the understanding of embodiments of the present disclosure. Execution unit 142 is used for executing instructions received by processing core 159. In addition to performing typical processor instructions, execution unit 142 can perform instructions in packed instruction set 143 for performing operations on packed data formats. Packed instruction set 143 includes instructions for performing embodiments of the disclosure and other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations. In one embodiment, the decoder is used to interpret the opcode of the instruction, which will indicate what operation should be performed on the corresponding data indicated within the instruction.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
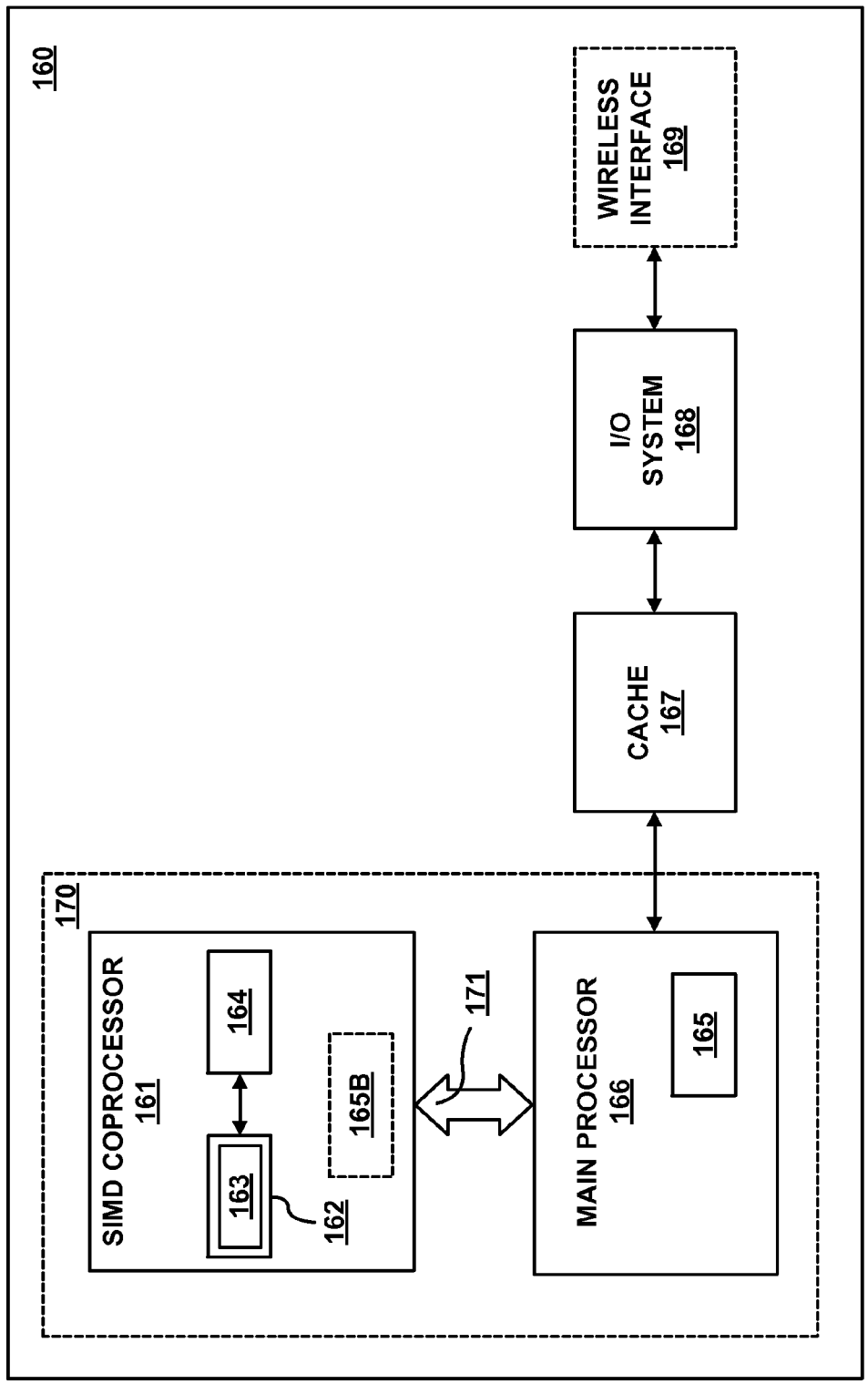
FIG. 1C illustrates a block diagram of a system according to one embodiment.

FIG. 1C illustrates yet alternative embodiments of a data processing system that may include execution units to execute an instruction in accordance with an embodiment of the present disclosure. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing operations including instructions in accordance with one embodiment. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including instructions in accordance with one embodiment for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of embodiments of the present disclosure.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 171 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including instructions in accordance with one embodiment.

Figure 2:
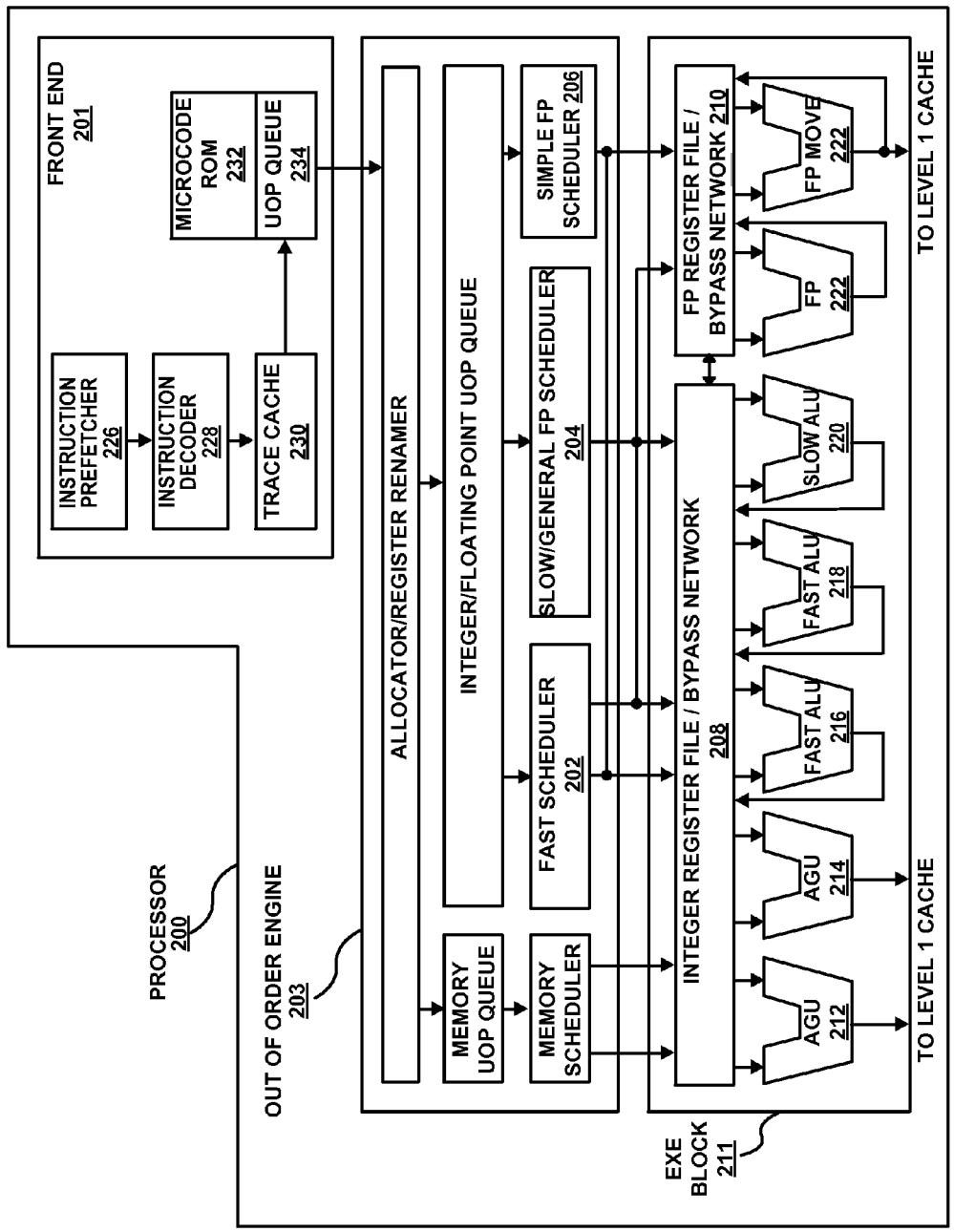
FIG. 2 illustrates a block diagram of a processor according to one embodiment.

FIG. 2 is a block diagram of the micro-architecture for a processor 200 that includes logic circuits to perform instructions in accordance with one embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete a instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to a entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of one embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For embodiments of the present disclosure, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

In one embodiment, the uops schedulers 202, 204, 206, dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology and 256 bits wide YMM registers relating to AVX, VAX2 or AVX3 can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

The processor may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like.

The processor may be implemented on one or more chips. The processor 500 may be a part of and/or may be implemented on one or more substrates using any of a number of process technologies, such as, for example, BiCMOS, CMOS, or NMOS.

Figure 3:
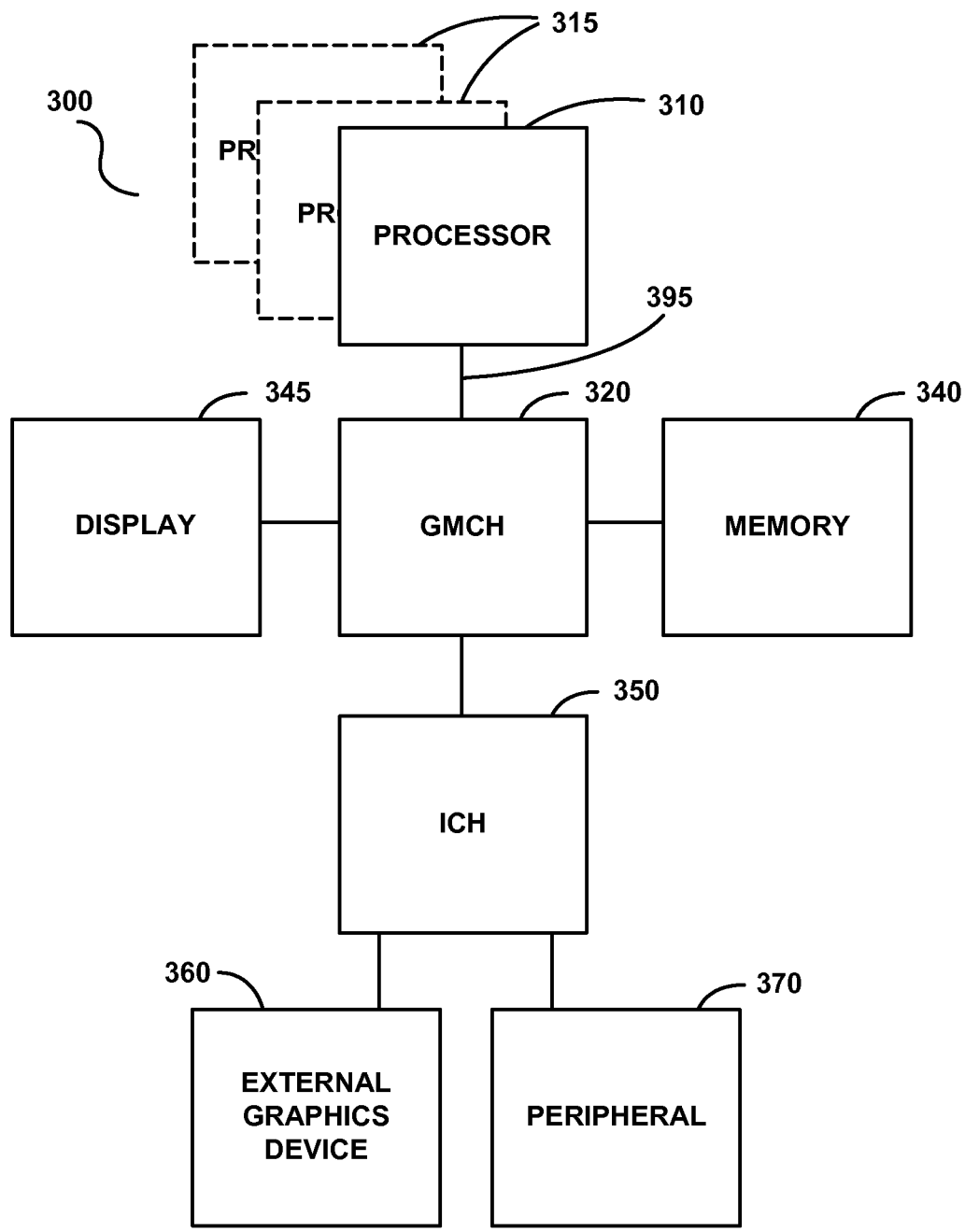
FIG. 3 illustrates a block diagram of a computer system according to one embodiment.

Referring now to FIG. 3, shown is a block diagram of a system 300 in accordance with one embodiment of the present disclosure. The system 300 may include one or more processors 310, 315, which are coupled to graphics memory controller hub (GMCH) 320. The optional nature of additional processors 315 is denoted in FIG. 3 with broken lines.

FIG. 3 illustrates that the GMCH 320 may be coupled to a memory 340 that may be, for example, a dynamic random access memory (DRAM). The DRAM may, for at least one embodiment, be associated with a non-volatile cache.

The GMCH 320 may be a chipset, or a portion of a chipset. The GMCH 320 may communicate with the processor(s) 310, 315 and control interaction between the processor(s) 310, 315 and memory 340. The GMCH 320 may also act as an accelerated bus interface between the processor(s) 310, 315 and other elements of the system 300. For at least one embodiment, the GMCH 320 communicates with the processor(s) 310, 315 via a multi-drop bus, such as a frontside bus (FSB) 395.

Furthermore, GMCH 320 is coupled to a display 345 (such as a flat panel display). GMCH 320 may include an integrated graphics accelerator. GMCH 320 is further coupled to an input/output (I/O) controller hub (ICH) 350, which may be used to couple various peripheral devices to system 300. Shown for example in the embodiment of FIG. 3 is an external graphics device 360, which may be a discrete graphics device coupled to ICH 350, along with another peripheral device 370.

Alternatively, additional or different processors may also be present in the system 300. For example, additional processor(s) 315 may include additional processors(s) that are the same as processor 310, additional processor(s) that are heterogeneous or asymmetric to processor 310, accelerators (such as, e.g., graphics accelerators or digital signal processing (DSP) units), field programmable gate arrays, or any other processor. There can be a variety of differences between the physical resources 310, 315 in terms of a spectrum of metrics of merit including architectural, micro-architectural, thermal, power consumption characteristics, and the like. These differences may effectively manifest themselves as asymmetry and heterogeneity amongst the processors 310, 315. For at least one embodiment, the various processors 310, 315 may reside in the same die package.

Figure 4:
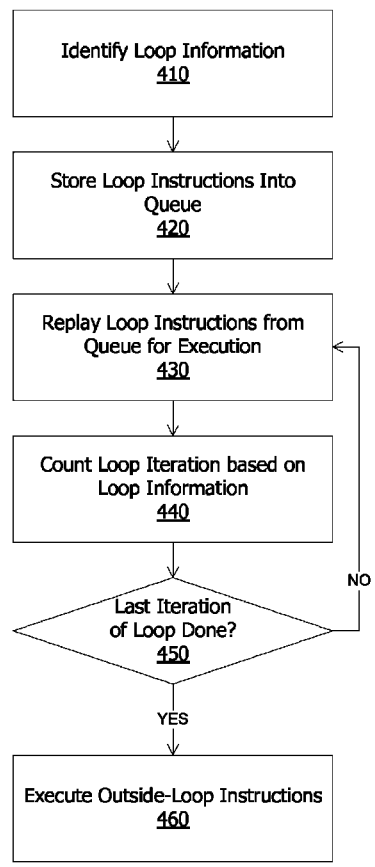
FIG. 4 illustrates a method according to one embodiment.

FIG. 4 illustrates a method 400 according to one embodiment.

The method 400 begins by identifying loop information corresponding to a plurality of loop instructions (block 410), before the instructions are executed. Then, the loop instructions are stored into a queue (block 420). The loop instructions are replayed from the queue for execution (block 430). Loop iteration is counted based on the identified loop information (block 440). A determination of whether the last iteration of the loop is done (block 450). If the last iteration is not done, then return to block 430 to continue replaying the loop instructions. If the last iteration is done, then exit the loop and execute outside-loop instructions (block 460).

Figure 5:
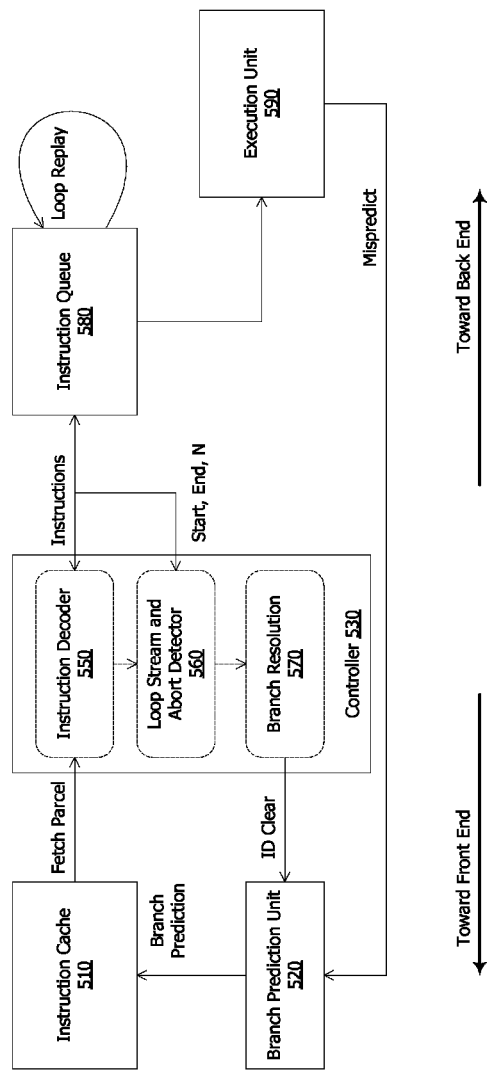
FIG. 5 illustrates a block diagram of a processor according to one embodiment.

FIG. 5 illustrates a block diagram of a processor 500 according to one embodiment, to implement the method 400 in FIG. 4.

The exemplary processor 500 may include a controller 530, an instruction cache (IC) 510, a Branch Prediction Unit (BPU) 520, an instruction queue (IQ) 580, and an execution unit 590.

Optionally (as indicated by dashed lines), the controller 530 may include an instruction decoder (ID) 550, a loop stream and abort detector 560, and a branch resolution 570.

The controller 530 may identify loop information corresponding to a plurality of loop instructions, before the instructions are executed. Then, the loop instructions are stored into the IQ 580. The loop instructions are replayed from the IQ 580 for execution. Loop iteration is counted based on the identified loop information. The IQ 580 may determine whether the last iteration of the loop is done. If the last iteration is not done, then the IQ 580 may continue replaying the loop instructions. If the last iteration is done, then the IQ 580 may exit the loop, and the execution unit 590 may execute outside-loop instructions.

The BPU 520 may provide predictions for branches direction and target, and may manage the look-ahead program Instruction Pointer (IP).

The IC 510 may fetch instruction chunks, which may be referred to as fetch parcels (FP), from a L0 instruction cache (not shown) based on the BPU's IP.

The controller 530, via the ID 550, may decode the instructions and saves them into the IQ 580. The controller 530, via the ID 550, may identify a loop information, for example a loop hint (LH), the start and the end loop instructions, or the loop body size. The ID may decode the LH and marks the current FP as the loop "start". If the first loop instruction spans two FPs, the LH may be for example in the second FP and indicate a S (start offset) of 0. The controller 530, via the branch resolution 570, may verify BPU predictions.

The IQ 580 may replay instructions into the processor Back End (BE) for execution and may verify the loop predictions. The IQ 580 may receive the loop information from the controller 530, and manages the loop replay based on the loop information.

In an exemplary embodiment, when a loop start is detected, the ID 550 may count the number of FP's fetched until the number is equal to a loop's body FP size. When the loop end is detected, the ID 550 may set the loop end mark in the IQ 580.

Even though the end FP has a taken branch inside which may cause an ID Clear, the end loop branch may be predicted as "not taken" by the ID 550. As a result, the instructions may continue to flow sequentially to outside-loop instructions, which are not allocated at the BPU target array, and thus no ID Clear need to be issued.

When a FP marked by the loop start is stored into the IQ 580, the IQ 580 write pointer plus the loop start offset (S) may be copied into the loop start read pointer and the loop start signal is asserted.

When the loop start is asserted, the IQ 580 entries may be read, but not reclaimed. The IQ 580 read entries thus may not be freed, and the IQ 580 eventually becomes full. As a result of the IQ 580 being full, additional fetch requests may be stopped. Thus, the IQ 580 may be informed of the loop information, and may be filled with loop instructions ready for replay of the loop instructions for the first iteration of the loop. Therefore, there is no need for "learning" time or warm up time. Consequently, coverage of loop instructions (proportion of amount of loop instructions replayed from an instruction queue) may be increased, and delay time and power consumption for loop execution may be reduced.

When a FP marked by the loop end is stored into the IQ 580, the IQ 580 write pointer plus the loop end offset (E) may be copied into the loop end read pointer.

When the IQ 580 read pointer is equal to the loop end read pointer, the loop replay indication may be asserted, and the loop start read pointer may copied into the next IQ 580 read pointer. The loop then may be replayed at the loop start location from the IQ 580 for another iteration. Therefore, for the subsequent iterations of the loop, coverage of loop instructions may be increased, and delay time and power consumption for loop execution may be reduced.

Once the ID 550 identifies a loop, the IQ 580 loop iteration counter may be initialized, for example by storing the value of the LH "i" field to the counter.

After each loop iteration, the IQ 580 may mark the loop end instruction as a taken branch and decrease the loop iterations counter. Toward the BE side, the execution unit 590 may verify that the end branch takes the correct direction. On the last loop iteration, when the iterations counter reaches zero, the IQ 580 may mark the loop end instruction as a Not Taken branch, and the loop replay is stopped. The execution unit 590 thus need not issue a mispredict on the last loop iteration. Since no mispredict is issued in the last loop iteration, the instruction pipeline need not be flushed, and delay in the pipeline may be avoided.

The ID 550 may mark the loop with different categories, for example, as a software detected loop. If initially the loop count size is undefined (i=0 initially), the ID 550 may mark the loop differently than a loop with defined count size, for example, as a hardware detected loop rather than as a software detected loop.

The ID 550 logic may also detect illegal conditions of the loop to abort the loop before the loop is replayed from the IQ 580. For example: assuming the code has a loop with an internal conditional branch that is always biased as not taken. At some large loop iteration, this conditional branch may be taken. As a result, the code execution may not be inside the loop defined by the loop information.

The loop detector in the embodiments above may be disabled, for example by using a chicken bit, if not needed.

Therefore, the loop detection in the embodiment above may improve loop detection and execution without modifying the processor back end.

Figure 6:
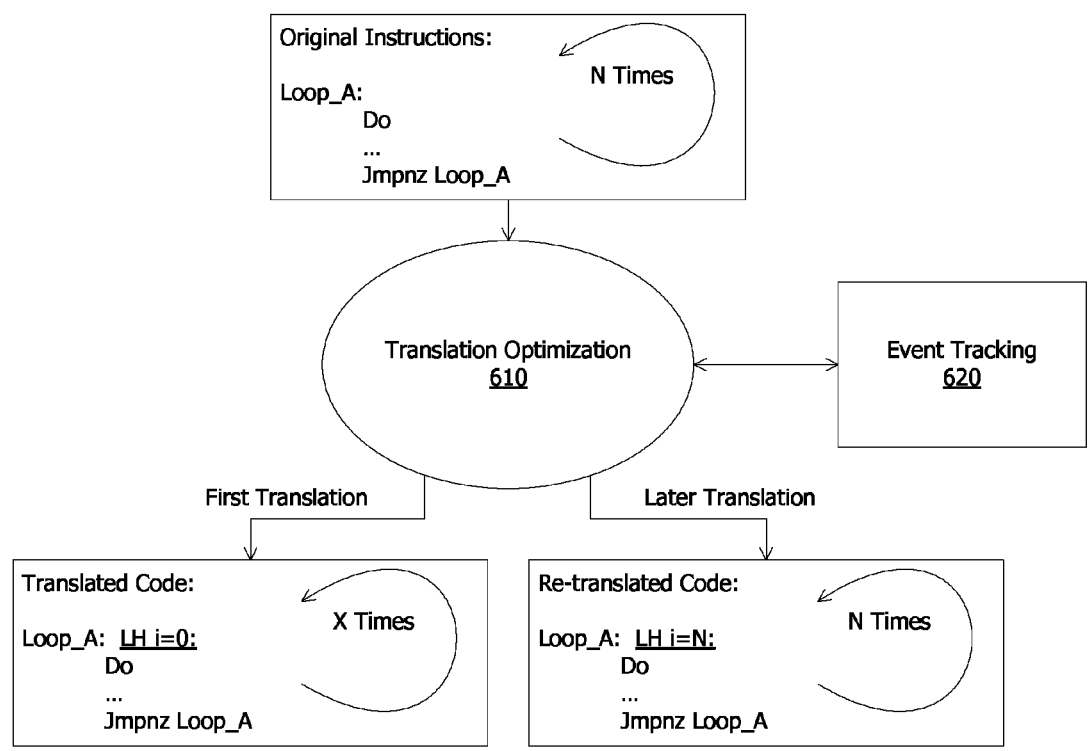
FIG. 6 illustrates a block diagram of a code translation optimization according to one embodiment.

FIG. 6 illustrates a block diagram of a code translation optimization, which may be implemented in the controller 530 in FIG. 5, according to one embodiment.

The controller 530 may perform the loop detection and execution, for example by using a software (SW) based algorithm, for translation optimization (block 610), in a processor that supports binary translation. Additionally, event tracking (block 620) may be performed to collect statistics data during the program execution.

In an embodiment, the translation optimization in the binary translation SW may use a special LH to mark the loop starting instruction, the number of loop instructions, the loop ending instruction (a backward jump), and/or a predicted count of loop iterations.

The LH mark may not disrupt normal program flow, and may be disregarded if the loop detection feature is disabled, for example by a chicken bit.

The LH may be placed as the first loop instruction and may specify the following:
- i—number of iterations (i>1)
- S—a start instruction offset inside loop's first FP
- E—an end instruction offset inside loop's last FP
- N—a number of the FP between the start and the end FP including the two FPs.

If the translation optimization 610 initially cannot determine the exact predicted count of loop iterations, the LH may be marked with i=0, which may cause the replaying of the loop indefinitely until a mispredict occurs.

The event tracking 620 may be used by the translation optimization 610 to improve the overall code performance and efficiency. The event tracking 620 may help the translation optimization 610 to determine the exact iteration count. If the exact predicted count of loop iterations was not initially determined, the translation optimization 610 determines the iteration count based on additional data from the event tracking 620, and the LH may be updated in the "i" field. This update may be implemented by a SMC (self modifying code) local change, and may not require a full code retranslation by the translation optimization 610.

Embodiments disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, a translation optimizer may be used to convert an instruction from a source instruction set to a target instruction set. For example, the translation optimizer may translate (e.g., using static binary translation, dynamic binary translation including dynamic compilation), morph, emulate, or otherwise convert an instruction to one or more other instructions to be processed by the core. The translation optimizer may be implemented in software, hardware, firmware, or a combination thereof. The translation optimizer may be on processor, off processor, or part on and part off processor.

While certain exemplary embodiments have been described and shown in the accompanying drawings, it is to be understood that such embodiments are merely illustrative of and not restrictive on the broad disclosure, and that this disclosure not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
    detecting, by a controller, a loop hint instruction characterizing a loop including a plurality of loop instructions, before any execution of the loop instructions occurs, wherein the loop hint instruction includes a loop iteration information specifying whether the loop is an indefinite loop or a definite loop, wherein a definite loop count is specified for the definite loop and no definite loop count is specified for the indefinite loop;
    storing loop information including the loop hint instruction and the loop instructions into an instruction queue;
    executing the loop instructions in a first iteration;
    counting a loop iteration based on the loop information;
    determining whether a last iteration of the loop instructions is completed; and
    replaying the loop instructions from the instruction queue for execution until the last iteration is completed,
    wherein at least one of delay time and power consumption is reduced.

2. The method of claim 1, wherein the controller marks the loop instructions in the queue, based on the loop information.

3. The method of claim 1, wherein the loop hint instruction and the plurality of loop instructions are contained in fetch parcels obtained from a cache, and wherein the loop hint instruction further includes (i) a start instruction offset inside the loop's first fetch parcel, (ii) an end instruction offset inside the loop's last fetch parcel, and (iii) a total number of fetch parcels in the loop including the first and last fetch parcels.

4. A method comprising:
    identifying, by a controller, loop information corresponding to a plurality of loop instructions, before any execution of the loop instructions occurs;
    storing the loop instructions into a queue;
    executing the loop instructions in a first iteration;
    counting a loop iteration based on the identified loop information;
    determining whether a last iteration of the loop instructions is completed; and
    replaying the loop instructions from the queue for execution until the last iteration is completed,
    wherein at least one of delay time and power consumption is reduced, and wherein the controller updates the loop instructions in the queue, based on historical execution information, by replacing an indefinite loop with a definite loop by a local change via self-modifying code.

5. The method of claim 1, wherein the queue predictively executes an outside-loop instruction after the last iteration is completed without a mispredict that would require an instruction pipeline flush.

6. The method of claim 1, wherein the controller detects illegal conditions of the loop and aborts the loop before the loop instructions are replayed.

7. A non-transitory computer readable medium, storing instructions executable by a processor to perform:

detecting, by a controller, a loop hint instruction characterizing a loop including a plurality of loop instructions, before any execution of the loop instructions occurs, wherein the loop hint instruction includes a loop iteration information specifying whether the loop is an indefinite loop or a definite loop, wherein a definite loop count is specified for the definite loop and no definite loop count is specified for the indefinite loop;

storing loop information including the loop hint instruction and the loop instructions into an instruction queue;

executing the loop instructions in a first iteration;

counting a loop iteration based on the loop information;

determining whether a last iteration of the loop instructions is completed; and replaying the loop instructions from the instruction queue for execution until the last iteration is completed, wherein at least one of delay time and power consumption is reduced.

8. The non-transitory computer readable medium of claim 7, wherein the controller marks the loop instructions in the queue, based on the loop information.

9. The non-transitory computer readable medium of claim 7, wherein the loop hint instruction and the plurality of loop instructions are contained in fetch parcels obtained from a cache, and wherein the loop hint instruction further includes (i) a start instruction offset inside the loop's first fetch parcel, (ii) an end instruction offset inside the loop's last fetch parcel, and (iii) a total number of fetch parcels in the loop including the first and last fetch parcels.

10. A non-transitory computer readable medium, storing instructions executable by a processor to perform:

identifying, by a controller, loop information corresponding to a plurality of loop instructions, before any execution of the loop instructions occurs;

storing the loop instructions into a queue;

executing the loop instructions in a first iteration;

counting a loop iteration based on the identified loop information;

determining whether a last iteration of the loop instructions is completed; and replaying the loop instructions from the queue for execution until the last iteration is completed, wherein at least one of delay time and power consumption is reduced, and wherein the controller updates the loop instructions in the queue, based on historical execution information, by replacing an indefinite loop with a definite loop by a local change via self-modifying code.

11. The non-transitory computer readable medium of claim 7, wherein the queue predictively executes an outside-loop instruction after the last iteration is completed without a mispredict that would require an instruction pipeline flush.

12. The non-transitory computer readable medium of claim 7, wherein the controller detects illegal conditions of the loop and aborts the loop before the loop instructions are replayed.

13. A processor comprising:

a controller that detects a loop hint instruction characterizing a loop including a plurality of loop instructions, before any execution of the loop instructions occurs, wherein the loop hint instruction includes a loop iteration information specifying whether the loop is an indefinite loop or a definite loop, a definite loop count being specified for the definite loop and no definite loop count being specified for the indefinite loop;

an instruction queue that stores loop information including the loop hint instruction and the loop instructions; and an execution unit that executes the loop instructions in a first iteration, wherein a loop iteration is counted based on the loop information, whether a last iteration of the loop instructions is completed is determined, and the instruction queue replays the loop instructions for execution until the last iteration is completed, wherein at least one of delay time and power consumption is reduced.

14. The processor of claim 13, wherein the controller marks the loop instructions in the queue, based on the loop information.

15. The processor of claim 13, wherein the loop hint instruction and the plurality of loop instructions are contained in fetch parcels obtained from a cache, and wherein the loop hint instruction further includes (i) a start instruction offset inside the loop's first fetch parcel, (ii) an end instruction offset inside the loop's last fetch parcel, and (iii) a total number of fetch parcels in the loop including the first and last fetch parcels.

16. A processor comprising:

a controller that identifies loop information corresponding to a plurality of loop instructions, before any execution of the loop instructions occurs;

a queue that stores the loop instructions; and an execution unit that executes the loop instructions in a first iteration, wherein a loop iteration is counted based on the identified loop information, whether a last iteration of the loop instructions is completed is determined, and the queue replays the loop instructions for execution until the last iteration is completed, wherein at least one of delay time and power consumption is reduced, and wherein the controller updates the loop instructions in the queue, based on historical execution information, by replacing an indefinite loop with a definite loop by a local change via self-modifying code.

17. The processor of claim 13, wherein the controller detects illegal conditions of the loop and aborts the loop before the loop instructions are replayed.

* * * * *

UNITED STATES PATENT AND TRADEMARK OFFICE
CERTIFICATE OF CORRECTION

| | | |
|---|---|---|
| PATENT NO. | : 9,459,871 B2 | Page 1 of 1 |
| APPLICATION NO. | : 13/731377 | |
| DATED | : October 4, 2016 | |
| INVENTOR(S) | : Maria Lipshits et al. | |

It is certified that error appears in the above-identified patent and that said Letters Patent is hereby corrected as shown below:

On the Title Page

At (72), Inventors: Delete "Lihu Rappaport" and replace with --Lihu Rappoport--.

Signed and Sealed this
Twenty-fifth Day of April, 2017

Michelle K. Lee
*Director of the United States Patent and Trademark Office*